March 28, 1939.   W. E. GROSS ET AL   2,152,044
AUTOMATIC CLUTCH SHIFTER
Filed Feb. 7, 1938   3 Sheets-Sheet 2
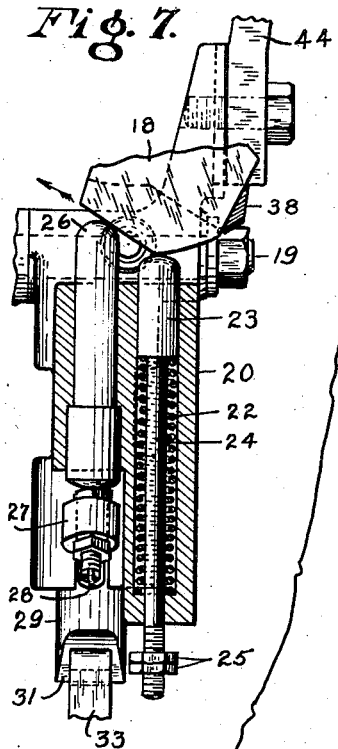
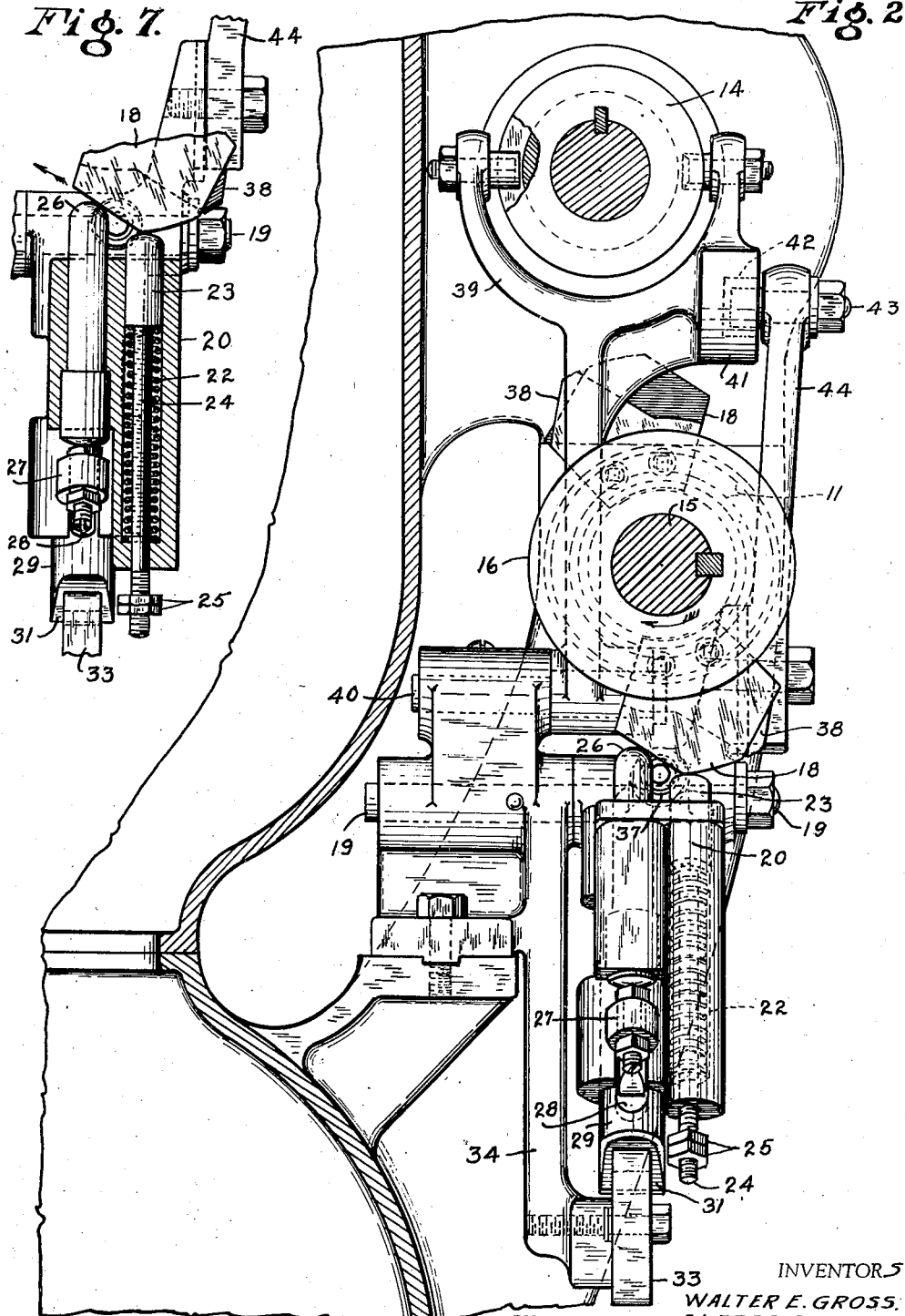
INVENTORS
WALTER E. GROSS.
ALFRED F. JELINEK
ATTORNEYS March 28, 1939. W. E. GROSS ET AL 2,152,044
AUTOMATIC CLUTCH SHIFTER
Filed Feb. 7, 1938 3 Sheets-Sheet 3
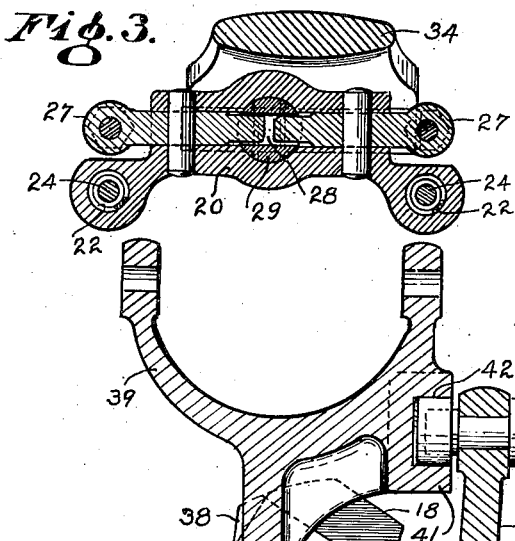
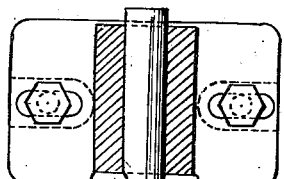
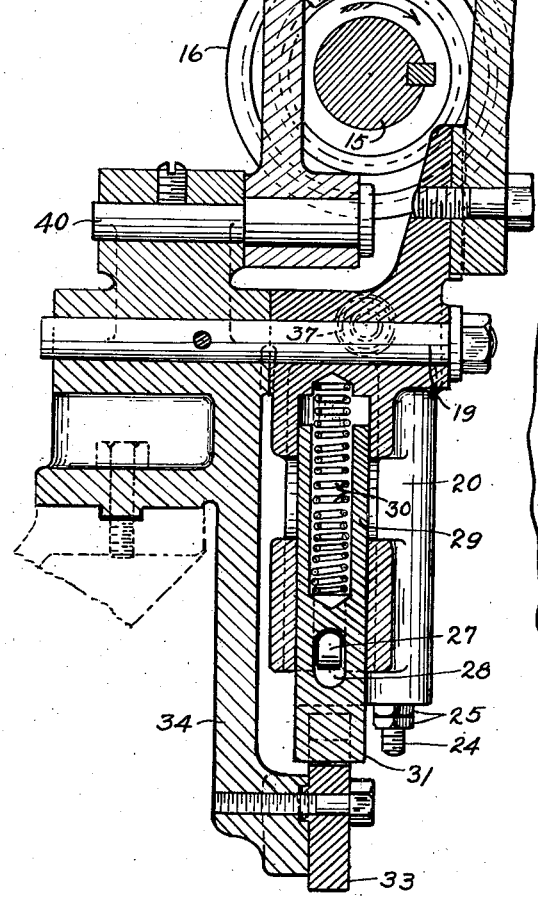
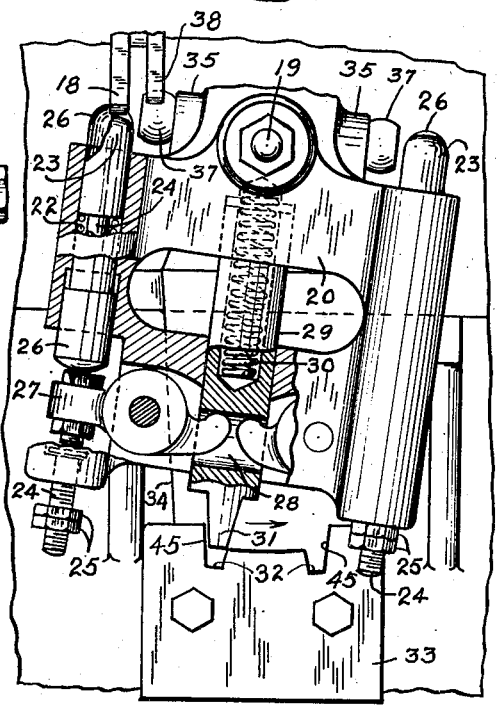
INVENTORS.
WALTER E. GROSS.
ALFRED F. JELINEK.
BY Rickey & Watts.
ATTORNEYS Patented Mar. 28, 1939

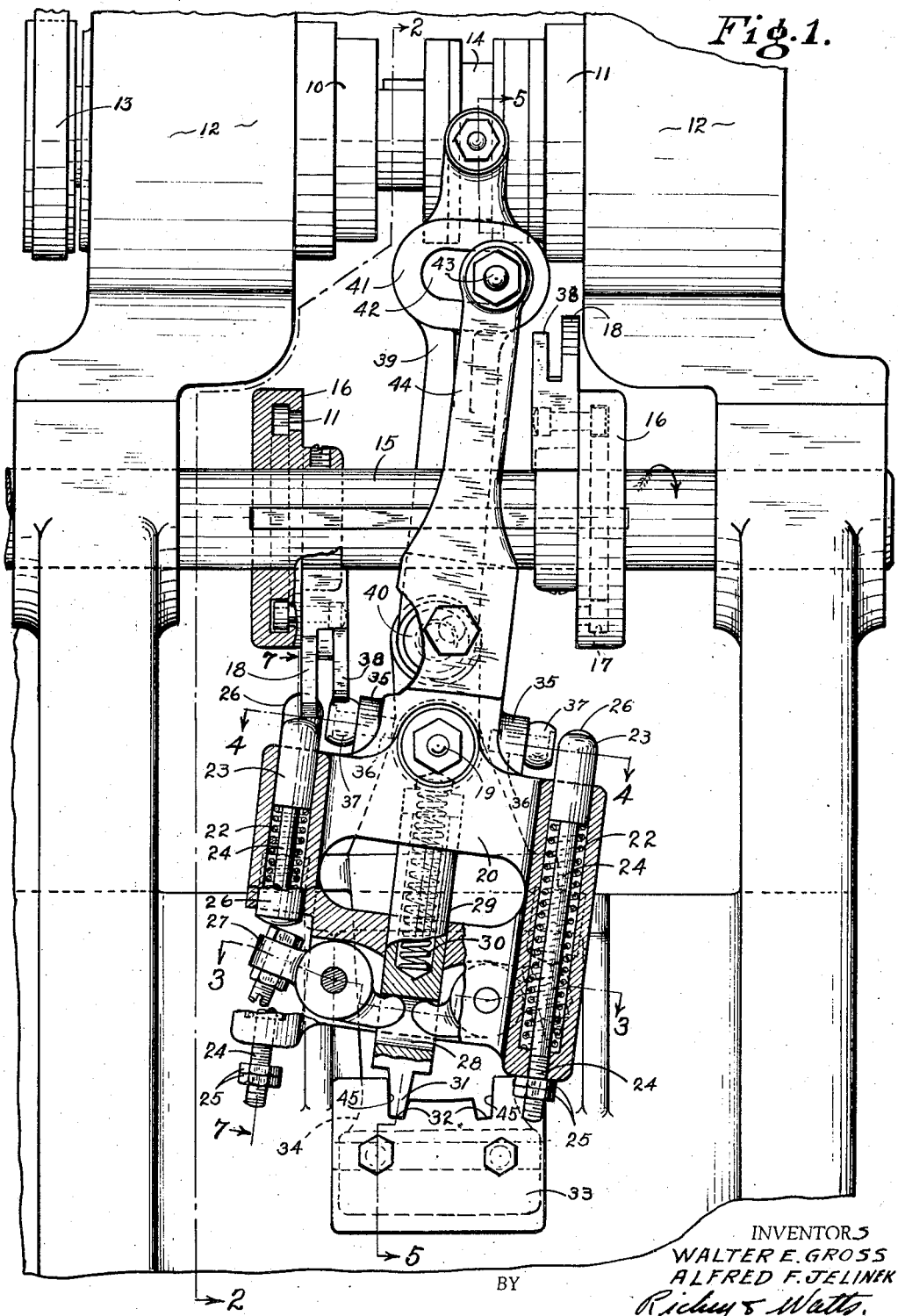

2,152,044

UNITED STATES PATENT OFFICE 2,152,044

AUTOMATIC CLUTCH SHIFTER

Walter E. Gross and Alfred F. Jelinek, Cleveland, Ohio, assignors to The Cleveland Automatic Machine Company, Cleveland, Ohio, a corporation of Ohio Application February 7, 1938, Serial No. 189,129

6 Claims. (Cl. 74—100)

This invention relates broadly to mechanism for the actuation of sliding clutch members and more specifically to a shifting device adapted for use in conjunction with clutches associated with mechanisms which require rapid actuation and the application of appreciable effort to separate the engaged members thereof.

The invention is further directed in a cam structure for the positive control of devices of this character to safeguard the operation thereof in the event of failure of the springs embodied in the device.

In automatic screw machines where devices of the character have been used in shifting the belt to effectuate the reversal or change of speed of the machine it has been the practice heretofore to employ an oscillating arm or shifter fork actuated by a pre-loaded spring organized for release by a cam operated trigger which effectuated the rapid operation of the arm and consequent lateral translation of the belt.

In practice it has been found that the springs employed in such devices were subject to an appreciable strain and would frequently break or lose their normal unstressed form, with the result of high tool breakage and loss of the stock in process.

The present invention contemplates in addition to the spring actuating mechanism aforesaid a cam which is adapted to effect the positive operation of the oscillatory member, and thus safeguard the operation of the device in the event of failure of the springs.

The invention further comprehends a shifting device which is capable of exerting a blow of sufficient force to assure the disengagement of the coordinated members of a clutch under the load imposed thereon, as for example, a clutch which is employed in a machine tool in substitution for the belt shifter commonly employed to effect the reversal or change of speed of the machine.

In addition to the foregoing objects and advantages, the invention contemplates a clutch shifting mechanism which is economic of manufacture, durable of construction and dependable of operation.

Other objects and advantages more or less ancillary to the foregoing and the manner in which all the various objects are realized will appear in the following description which, considered in connection with the accompanying drawings, sets forth the preferred embodiment of the invention.

Referring to the drawings wherein the preferred embodiment of the invention is illustrated:

Fig. 1 is a front elevational view of the clutch and the improved shifting device therefor, certain portions thereof being broken away and shown in section in the interest of clarity;

Fig. 2 is a vertical sectional view through a machine embodying a sliding clutch member, the section being taken on the plane indicated by the line 2—2 in Fig. 1, wherein the clutch shifting device, as illustrated in Fig. 1, is shown in side elevation;

Fig. 3 is a transverse sectional view through a portion of the clutch shifting device, the section being taken on the plane indicated by the line 3—3 in Fig. 1;

Fig. 4 is a transverse sectional view through another portion of the clutch shifting device, the section being taken on the plane indicated by the line 4—4 in Fig. 1;

Fig. 5 is a vertical sectional view through the clutch shifting mechanism, the section being taken on a plane indicated by the line 5—5 in Fig. 1;

Fig. 6 is a fragmentary view of a portion of the clutch shifting device shown in Fig. 1, certain parts of the device being broken away and shown in section; and Fig. 7 is a sectional view of a portion of the shifting device, the section being taken on a plane indicated by the line 7—7 in Fig. 1.

As illustrated in Fig. 1, where, for purposes of illustration only, the clutch shifting device is illustrated in conjunction with an automatic screw machine, the clutch members 10 and 11 are shown as mounted upon a shaft journaled in bearings 12 constituting herein a portion of the machine tool structure. The clutch members may be of any of the conventional forms which comprise generally the driving member 10 operatively associated with a drive belt 13, the reciprocating sleeve 14 and the driven member 11. In the present case a rotatively driven shaft 15 is mounted upon the machine adjacent the clutch assembly and upon this shaft there is keyed a pair of discs 16 having annular T-slots 17 in the faces thereof for the support of cam operating plates 18. Below the shaft 15 and pivotally supported upon the frame or bed of the machine, by means of a stub arbor 19, there is an arm comprising an enlarged base portion 20 adapted to receive the spring plungers and release mechanism and machined for the affixation of an arm or link extending upwardly in juxtaposition with the clutch.

The base 20 of the rocker arm is bored to receive compression springs 22 disposed in spaced relation to the fulcrum or stub arbor 19 and in the plane of the cam plates 18. The upper portions of the springs 22 are engaged by shouldered plungers or tappet rods 23 having depending shanks 24 threaded to receive nuts 25 for adjustment of the spring tension and height of the tappet rods relative to the lift of the cam plates 18. Adjacent the springs 22 and rearward thereof there is a second pair of plungers 26 (see Figs. 2 and 3) disposed for engagement with the cams 18 and with the free ends of rocker arms 27 pivotally mounted within recessed portions of the arm 20. The inner ends of the rocker arms 27 are formed with fingers engageable within a slot 28 formed in a throw bolt 29 bored to receive a compression spring 30 seated between the base of the bore within the plunger and a recess formed in the upper portion of the base 20 of the arm. The lower end of the bolt 29 is constructed with a tapered end or trigger 31 engageable within recesses 32 in a stop plate 33 depending from a bracket 34 mounted upon the bed of the machine. Adjacent the stub arbor 19 there is a pair of laterally extended bosses 35 drilled to receive pins 36 for the support of spherical faced rollers 37, the rollers being disposed for engagement with cam plates 38 mounted on the discs 16 contiguous the cam plates 18.

The clutch shifter fork 39 is pivotally supported upon a shouldered pin 40 mounted superjacent the stub arbor 19, in a boss formed in the supporting bracket for the base of the arm 20. Upon the forward face of the fork 39 there is a boss 41 formed with an arcuate elongated recess 42 for the reception of a pintle 43 mounted in an arm 44 constituting the upper portion of the arm 20. The length of the arm 44 is proportioned in relation to the clutch travel to effectuate the disengagement of one of the clutch members and reengagement of the opposed clutch member during each oscillatory movement of the arm as effected by the respective cams. The recess 42 is of suitable length to afford the free translation of the upper portion of the arm 44 before it engages the end wall thereof so that the pintle 43 when moved to abutting engagement therewith will strike a blow of sufficient force to overcome the frictional resistance imposed upon the clutch members as a result of the load applied thereon.

In operation as the cam 18 revolves into engagement with the tappet 23, the spring 22 will be compressed and held in such position by the dwell of the cam 18 until the cam in its continued rotative cycle depresses the second plunger 26, actuates the rocker arm 27, and in turn elevates the throw bolt 29 to the position where the trigger 31 thereof is freed from the recess 32. Upon release of the trigger or latch member 31 the spring 22, still compressively held by the cam 18, will cause the arm 20 to oscillate about its fulcrum until the trigger 31 abuts the shoulder 45 in the plate 33 whereupon the spring 30 effectuates the entry of the trigger in the opposed notch or recess 32. In the timed order of operation the cam 18 is revolved to clear the spring tappet 23 and plunger 26 immediately after the arm is swung beyond a plane passing through the vertical axis of the fulcrum 19. After the cam 18 has cleaned the plunger 26 the spring 30 within the throw bolt 29 will reposition the rocker arm 27 and elevate the plunger coordinated therewith for operative engagement with the second cam 18 in the succeeding cycle of operation.

In the event the springs 22 or 30 should fail for any reason, as for example, through the permanent foreshortened set or the breakage thereof, the arm 20 will be oscillated by the engagement of the cams 38 with the rollers 37 affixed to the base of the arm 20.

Obviously, as the arm 44 is oscillated the pin 43 will travel freely in the recess 43 until it strikes the end wall thereof and causes the oscillation of the shifter fork 39. By virtue of such construction the engaged members of the clutch will be subjected to a blow or shock which will effectuate the separation thereof with expedition and with more certainty of operation than could be attained through the application of a constant load pressure.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. Mechanism for the actuation of the sliding member of a double throw clutch comprising an arm pivoted intermediate its ends, rollers extended therefrom in spaced relation to the medial axis of the arm, cams engageable with said rollers for oscillating said arm, a second arm having a recess therein disposed in juxtaposition with the first named arm and engaged with the sliding member of said clutch, a pintle in the first named arm engaged within said recess, the size of said recess being proportioned in relation to said pintle and the lift of said cams to permit the independent movement of the first named arm throughout a portion of its oscillatory movement.

2. Mechanism for the actuation of a sliding clutch member, comprising an arm, a pivot intermediate the ends thereof, bearings adjacent said pivot and in spaced relation therewith, rotatable cams engageable with said bearings for oscillating said arm, a pivotally mounted yoke connected to said sliding clutch member and adjacent said arm and a lost motion connection between said arm and said yoke.

3. Mechanism for the actuation of a clutch member comprising an arm mounted for oscillation in a plane parallel the axis of the shaft of said clutch, rotatable cams disposed adjacent the sides of said cam, rollers on the opposed sides of said arm engageable with said cams, a pintle in an end portion of said arm, a pivoted lever adjacent said arm having an arcuate recess therein, said pintle being engaged within said recess and freely movable therein throughout a portion of the oscillatory movement of the first named arm and a yoke on the free end of the second named arm engageable with said clutch member.

4. A clutch shifting mechanism comprising an arm, a pivot pin disposed intermediate the ends thereof, rollers on opposite sides of said pivot pin and in spaced relation to the medial axis thereof, rotatable cams alternately engageable respectively with said rollers for effecting the oscillation of said arm, a second pivot at one end and having an arcuate recess therein intermediate its ends, a pintle in the end of the first named lever engaged within said recess, a yoke on the free end of the second named arm engaged with the sliding member of a clutch, the size of the arcuate recess in the second named arm being greater than the diameter of the pintle therein and less than the length of the oscillatory translation thereof.

5. A clutch shifting mechanism comprising an arm pivoted intermediate its ends, means alternately engageable with the opposite sides of said arm for causing the oscillatory movement thereof, a second arm pivoted at one end upon a stationary pintle and having the opposed end thereof engaged with a clutch member and abutments upon the first and second named arms for transmitting a portion of the oscillatory movement of the first named arm to the second named arm.

6. A clutch shifting mechanism comprising an arm pivoted intermediate its ends, bearings on the opposite sides of said arm in spaced relation to the pivot, rotatively driven cams alternately engageable with said bearings for oscillating said arm, a second arm pivoted at one end upon a stationary pintle and having the opposed end thereof engaged with a clutch member and means for transmitting movement of the first named arm to the second named arm subsequent the initial movement of the first named arm.

WALTER E. GROSS.
ALFRED F. JELINEK.